United States Patent
Rao et al.

(10) Patent No.: US 11,169,941 B2
(45) Date of Patent: Nov. 9, 2021

(54) HOST DEVICE WITH AUTOMATED CONNECTIVITY PROVISIONING

(71) Applicant: EMC IP Holding Company LLC, Hopkinton, MA (US)

(72) Inventors: Vinay G. Rao, Bangalore (IN); Sanjib Mallick, Bangalore (IN); Owen Crowley, Carrigaline (IE); Peniel Charles, Bangalore (IN); Erik P. Smith, Douglas, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/844,017

(22) Filed: Apr. 9, 2020

(65) Prior Publication Data

US 2021/0318967 A1 Oct. 14, 2021

(51) Int. Cl.
*G06F 13/16* (2006.01)
*G06F 13/42* (2006.01)

(52) U.S. Cl.
CPC ...... *G06F 13/1668* (2013.01); *G06F 13/4221* (2013.01); *G06F 13/4234* (2013.01); *G06F 2213/0036* (2013.01)

(58) Field of Classification Search
CPC ............. G06F 13/1668; G06F 13/4221; G06F 13/4234; G06F 2213/0036
See application file for complete search history.

(56) References Cited

U.S. PATENT DOCUMENTS 6,567,397 B1  5/2003  Campana et al.
6,687,746 B1  2/2004  Shuster et al.
(Continued)

FOREIGN PATENT DOCUMENTS

CN  103677927 B  2/2017
EP  1117028 A2  7/2001
(Continued)

OTHER PUBLICATIONS

Kris Piepho, "Dell EMC SC Series Storage: Microsoft Multipath I/O," Dell EMC Best Practices, Jan. 2017, 57 pages.
(Continued)

*Primary Examiner* — Brian T Misiura
(74) *Attorney, Agent, or Firm* — Ryan, Mason & Lewis, LLP

(57) ABSTRACT

A host device comprises a processor coupled to a memory. The host device is configured to obtain from a storage system connectivity information characterizing one or more ports of the storage system, and to automatically establish connectivity of a particular type between the host device and one or more logical storage devices of the storage system based at least in part on the obtained connectivity information. For example, the host device can obtain the connectivity information directly from the storage system or via at least one intermediary device such as a management station. In some embodiments, the obtaining and automatically establishing are performed by at least one multi-path input-output driver of a multi-path layer of the host device. The connectivity of a particular type illustratively comprises Internet Small Computer System Interface (iSCSI) connectivity between the host device and the storage system, although other connectivity types can be supported.

20 Claims, 6 Drawing Sheets

(56) References Cited

U.S. PATENT DOCUMENTS

| | | |
|---|---|---|
| 6,697,875 B1 | 2/2004 | Wilson |
| 7,275,103 B1 | 9/2007 | Thrasher et al. |
| 7,454,437 B1 | 11/2008 | Lavallee et al. |
| 7,617,292 B2 | 11/2009 | Moore et al. |
| 7,668,981 B1 | 2/2010 | Nagineni et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,201,803 B1 | 12/2015 | Derbeko et al. |
| 9,400,611 B1 | 7/2016 | Raizen |
| 9,430,368 B1 | 8/2016 | Derbeko et al. |
| 9,594,780 B1 | 3/2017 | Esposito et al. |
| 9,647,933 B1 | 5/2017 | Tawri et al. |
| 9,672,160 B1 | 6/2017 | Derbeko et al. |
| 9,696,917 B1 * | 7/2017 | Sareena ............. G06F 12/0868 |
| 9,778,852 B1 | 10/2017 | Marshak et al. |
| 10,007,455 B1 * | 6/2018 | George ................ G06F 3/0637 |
| 10,133,743 B2 * | 11/2018 | Venkat ................ G06F 3/0604 |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,369 B1 | 12/2019 | Mallick et al. |
| 10,606,496 B1 | 3/2020 | Mallick et al. |
| 10,789,006 B1 * | 9/2020 | Gokam .................. G06F 3/067 |
| 10,936,335 B2 * | 3/2021 | Mallick ............... G06F 9/44505 |
| 11,012,512 B1 * | 5/2021 | Mallick ............... H04L 67/1097 |
| 2002/0023151 A1 | 2/2002 | Iwatani |
| 2002/0103923 A1 | 8/2002 | Cherian et al. |
| 2004/0010563 A1 | 1/2004 | Forte et al. |
| 2006/0026346 A1 | 2/2006 | Kadoiri et al. |
| 2006/0277383 A1 | 12/2006 | Hayden et al. |
| 2007/0174849 A1 | 7/2007 | Cheung et al. |
| 2008/0043973 A1 | 2/2008 | Lai et al. |
| 2008/0201458 A1 | 8/2008 | Salil |
| 2009/0138608 A1 * | 5/2009 | Arroyo ............... H04L 67/1002 709/228 |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2013/0117766 A1 | 5/2013 | Bax et al. |
| 2014/0105068 A1 | 4/2014 | Xu |
| 2015/0222705 A1 | 8/2015 | Stephens |
| 2015/0242134 A1 | 8/2015 | Takada et al. |
| 2016/0020965 A1 * | 1/2016 | Sakata ................ G06F 11/3409 714/4.12 |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2017/0041182 A1 * | 2/2017 | Hanko .................. H04L 49/501 |
| 2017/0235507 A1 | 8/2017 | Sinha et al. |
| 2018/0189635 A1 | 7/2018 | Olarig et al. |
| 2018/0253256 A1 | 9/2018 | Bharadwaj |
| 2018/0317101 A1 | 11/2018 | Koue |
| 2018/0321861 A1 * | 11/2018 | Rao ........................ G06F 3/065 |
| 2019/0095299 A1 | 3/2019 | Liu et al. |
| 2019/0108888 A1 | 4/2019 | Sarkar et al. |
| 2019/0238628 A1 * | 8/2019 | Schmidt ............. H04L 67/1097 |
| 2020/0097203 A1 | 3/2020 | Mallick et al. |
| 2020/0106698 A1 | 4/2020 | Rao et al. |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |

OTHER PUBLICATIONS

NVM Express, "NVM Express, Revision 1.3," NVM Express, May 1, 2017, 282 pages.

VMWARE, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

Emc, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS vol. Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

U.S. Appl. No. 15/795,653 filed in the name of Maneesh Pusalkar et al. Oct. 27, 2017, and entitled "Storage System with Network-Wide Configurable Device Names."

U.S. Appl. No. 16/155,429 filed in the name of Rimpesh Patel et al. Oct. 9, 2018, and entitled "Categorizing Host IO Load Pattern and Communicating Categorization to Storage System."

U.S. Appl. No. 16/155,491 filed in the name of Kundan Kumar et al. Oct. 9, 2018, and entitled "Migrating Control of a Multi-Path Logical Device from a Current MPIO Driver to a Target MPIO Driver."

U.S. Appl. No. 16/697,393 filed in the name of Vinay G. Rao et al. Nov. 27, 2019, and entitled "Automated Seamless Migration of Logical Storage Devices."

U.S. Appl. No. 16/710,828 filed in the name of Amit PundalikAnchi et al. Dec. 11, 2019, and entitled "Automated Seamless Migration with Signature Issue Resolution."

* cited by examiner

HOST DEVICE WITH AUTOMATED CONNECTIVITY PROVISIONING

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (I/O) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. Various types of storage access protocols can be used by host devices to access the logical storage volumes or other logical storage devices of the storage system, including by way of example Small Computer System Interface (SCSI) access protocols and NVM Express (NVMe) access protocols. In some situations, a host administrator may be required to execute complex manual processes in order to establish particular types of connectivity between host devices and a storage system. For example, conventional techniques for establishing Internet SCSI (iSCSI) connectivity typically involve host administrator performance of a separate instance of such a manual process for each host device, and the conventional techniques are therefore costly, time-consuming and error-prone.

SUMMARY

Illustrative embodiments provide techniques for automated host provisioning for iSCSI connectivity and other types of connectivity between a host device and a storage array or other storage system, which advantageously avoid the drawbacks of the conventional techniques described above.

In some embodiments, at least a portion of the automated host provisioning functionality is implemented in at least one host driver, such as a multi-path input-output (MPIO) driver of the host device. Other types of host drivers can be used in place of or in addition to one or more MPIO drivers. For example, in some embodiments, at least a portion of the disclosed automated connectivity provisioning functionality is carried out using one or more iSCSI drivers, or other types of non-MPIO host drivers.

As indicated above, conventional approaches to provisioning a host for iSCSI connectivity are problematic, in that a host administrator or other user generally has to execute a complex manual process in order to implement the host provisioning. Illustrative embodiments disclosed herein provide highly automated host provisioning arrangements that avoid the complications of conventional manual approaches.

In one embodiment, an apparatus comprises a host device that includes a processor and a memory, with the processor being coupled to the memory. The host device is configured to obtain from a storage system connectivity information characterizing one or more ports of the storage system, and to automatically establish connectivity of a particular type between the host device and one or more logical storage devices of the storage system based at least in part on the obtained connectivity information.

In some embodiments, the connectivity of a particular type comprises iSCSI connectivity between the host device and the storage system.

The connectivity information illustratively comprises at least a subset of an Internet Protocol (IP) address, a maximum transmission unit (MTU), and a virtual local area network (VLAN) configuration for at least one of the ports of the storage system, although additional or alternative connectivity information can be used in other embodiments.

In some embodiments, the host device further comprises a multi-path layer comprising at least one MPIO driver configured to control delivery of IO operations from the host device to particular ports of the storage system over selected ones of a plurality of paths through a network. The host device may be one of a plurality of host devices that includes one or more additional host devices each configured to communicate over the network with the storage system and wherein each additional host device comprises at least one MPIO driver configured to control delivery of IO operations from that host device to particular ports of the storage system over selected ones of a plurality of paths through the network.

The paths are illustratively associated with respective initiator-target pairs with each of a plurality of initiators of the initiator-target pairs comprising a corresponding host bus adaptor of the host device and each of a plurality of targets of the initiator-target pairs comprising a corresponding one of the ports of the storage system.

At least portions of the connectivity information obtained from the storage system and characterizing one or more ports of the storage system may be stored in a data structure of a kernel-space portion of the MPIO driver, although numerous other arrangements can be used to store the obtained connectivity information in the host device.

In some embodiments, obtaining from a storage system connectivity information characterizing one or more ports of the storage system comprises obtaining the connectivity information directly from the storage system utilizing an in-band communication mechanism in which one or more commands in a designated storage protocol are sent from the host device to the storage system.

As another example, obtaining from a storage system connectivity information characterizing one or more ports of the storage system illustratively comprises obtaining the connectivity information indirectly from the storage system utilizing an out-of-band communication mechanism via at least one intermediary device.

In some embodiments of this type, the intermediary device comprises an MPIO management station. The MPIO management station may comprise a server configured to obtain the connectivity information directly from the storage system. Alternatively, the MPIO management station can comprise a server configured to obtain the connectivity information from an additional host device that obtains the connectivity information directly from the storage system. Other types of management stations or more generally intermediary devices may be used in other embodiments.

The MPIO driver in some embodiments illustratively comprises a user-space component and a kernel-space component, and in such embodiments the obtaining of connectivity information and the automatically establishing connectivity of a particular type may be performed by the user-space component of the MPIO driver. Again, other types of host drivers can be configured to support automated host provisioning for iSCSI connectivity and other types of connectivity in other embodiments.

In some embodiments, automatically establishing connectivity of a particular type comprises selecting one or more host bus adaptors for use with one or more of the ports of the storage system, and configuring the one or more selected host bus adaptors utilizing at least a portion of the obtained connectivity information. Additional or alternative automated host provisioning operations can be performed in other embodiments.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
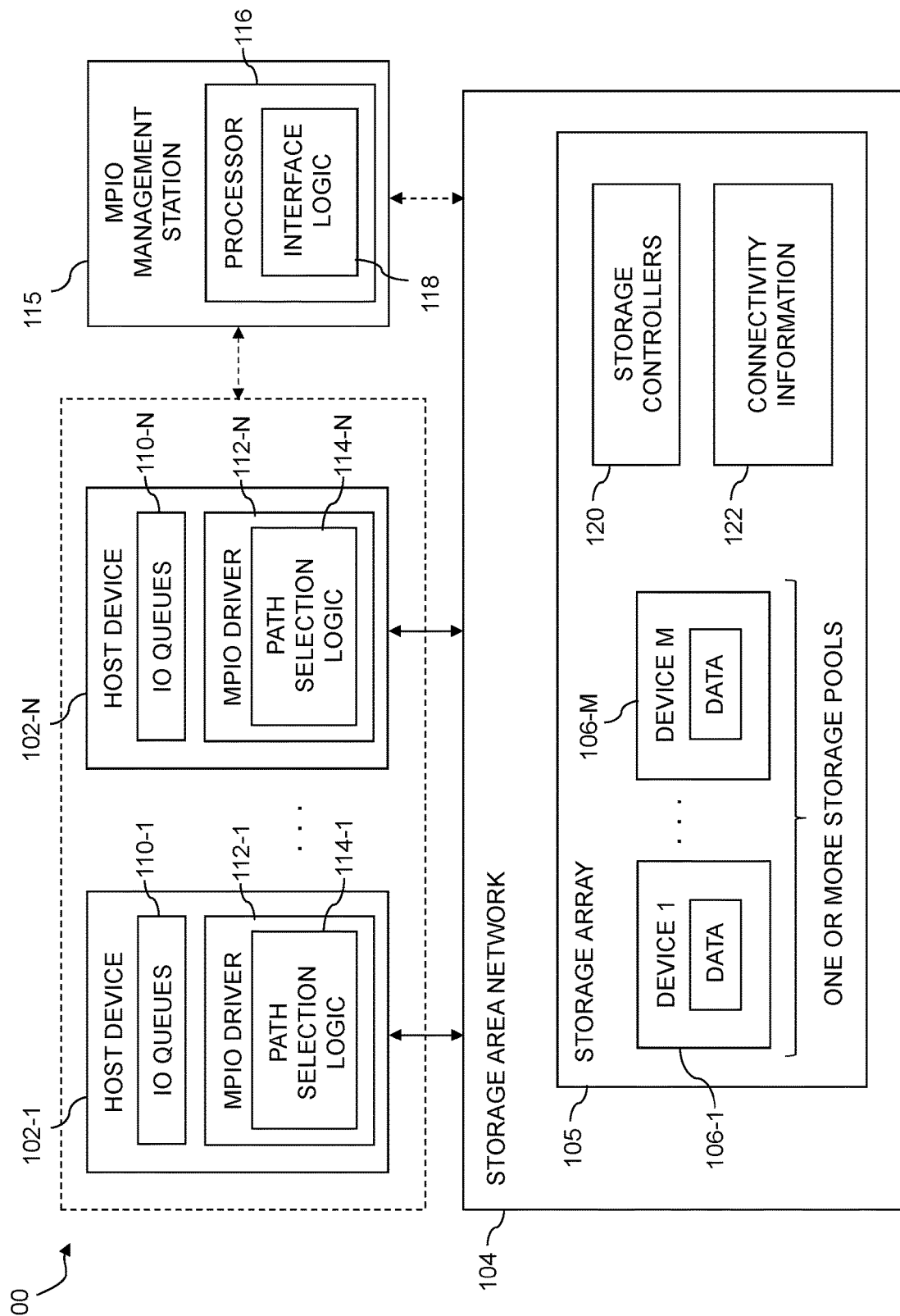
FIG. 1 is a block diagram of an information processing system configured with functionality for automated connectivity provisioning in a multi-path layer of a host device in an illustrative embodiment.

FIG. 1 shows an information processing system 100 configured in accordance with an illustrative embodiment. The information processing system 100 comprises a plurality of host devices 102-1, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, . . . 110-N and respective MPIO drivers 112-1, . . . 112-N. The MPIO drivers 112 collectively comprise a multi-path layer of the host devices 102. The multi-path layer provides functionality for automated connectivity provisioning. Such functionality is provided at least in part using respective instances of path selection logic 114-1, . . . 114-N implemented within the MPIO drivers 112.

The MPIO drivers 112 may comprise, for example, otherwise conventional MPIO drivers, such as PowerPath® drivers from Dell EMC, suitably modified in the manner disclosed herein to provide functionality for automated connectivity provisioning. Other types of MPIO drivers from other driver vendors may be suitably modified to incorporate functionality for automated connectivity provisioning as disclosed herein.

The host devices 102 can include additional or alternative components. For example, in some embodiments, the host devices 102 comprise respective local caches, implemented using respective memories of those host devices. A given such local cache can be implemented using one or more cache cards, possibly implementing caching techniques such as those disclosed in U.S. Pat. Nos. 9,201,803, 9,430,368 and 9,672,160, each entitled "System and Method for Caching Data," and incorporated by reference herein. A wide variety of different caching techniques can be used in other embodiments, as will be appreciated by those skilled in the art. Other examples of memories of the respective host devices 102 that may be utilized to provide local caches include one or more memory cards or other memory devices, such as, for example, an NVMe over PCIe cache card, a local flash drive or other type of NVM storage drive, or combinations of these and other host memory devices.

The system 100 further comprises an MPIO management station 115 that includes a processor 116 implementing interface logic 118. The interface logic 118 is utilized to communicate with the host devices 102 and the storage array 105. Such an MPIO management station 115 provides management functionality for the multi-path layer comprising the MPIO drivers 112 of the host devices 102. In some embodiments, host device management software executing on the MPIO management station 115 interacts with storage array management software executing on the storage array 105.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

A given IO operation is therefore illustratively generated by a process of an application running on the host device 102-1, and is queued in a given one of the IO queues 110-1 of the host device 102-1 with other operations generated by other processes of that application, and possibly other processes of other applications.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such 10 operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 3.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a "vendor unique command" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

In the FIG. 1 embodiment, the storage array 105 comprises a plurality of storage controllers 120 and one or more instances of connectivity information 122. The connectivity information 122 illustratively comprises information regarding the particular host devices 102 that have established connectivity to particular logical storage devices of the storage array 105. It is assumed in some embodiments that the MPIO drivers 112 of the host devices 102 can read or otherwise obtain at least portions of the connectivity information 122 from the storage array 105, although such an arrangement is not required.

At least portions of the connectivity information 122 can be obtained by the host device 102-1 from the storage array 105 utilizing an in-band communication mechanism in which one or more predetermined commands in a designated storage protocol are sent from the host device 102-1 to the storage array 105. Such predetermined commands can comprise, for example, a log sense command, a mode sense command, a "vendor unique command" or VU command, or combinations of multiple instances of these or other commands, in an otherwise standardized command format, such as a SCSI format or other type of format.

Additionally or alternatively, at least portions of the connectivity information 122 can be obtained by the host device 102-1 from the storage array 105 utilizing an out-of-band communication mechanism. For example, an out-of-band communication mechanism of this type can involve host management software of the host device 102-1 communicating with storage array management software of the storage array 105 over an IP network connection or other type of network connection. Such host management software can include software running on the MPIO management station 115, in addition to or in place of software running on the individual host devices 102.

Additional components not explicitly shown in the figure, such as one or more storage caches, may also be provided in the storage array 105 for use in processing IO operations. For example, in some embodiments, each of the storage controllers 120 has a different local cache or a different allocated portion of a global cache associated therewith, although numerous alternative arrangements are possible. The storage controllers 120 can be implemented as respective storage processors, directors or other storage system components configured to control storage system operations relating to processing of IO operations.

The MPIO driver 112-1 is further configured to obtain from the storage array 105 connectivity information characterizing one or more ports of the storage array 105, and to automatically establish connectivity of a particular type between the host device 102-1 and one or more logical storage devices of the storage array 105 based at least in part on the obtained connectivity information. The operations of obtaining connectivity information and automatically establishing connectivity of a particular type in some embodiments are more particularly performed by the user-space component of the MPIO driver 112-1, although other arrangements are possible.

An example of a process including such operations will be described below in conjunction with the flow diagram of FIG. 2. These and other operations referred to herein as being performed by an MPIO driver can in other embodiments be performed at least in part by other host device components.

Figure 4:
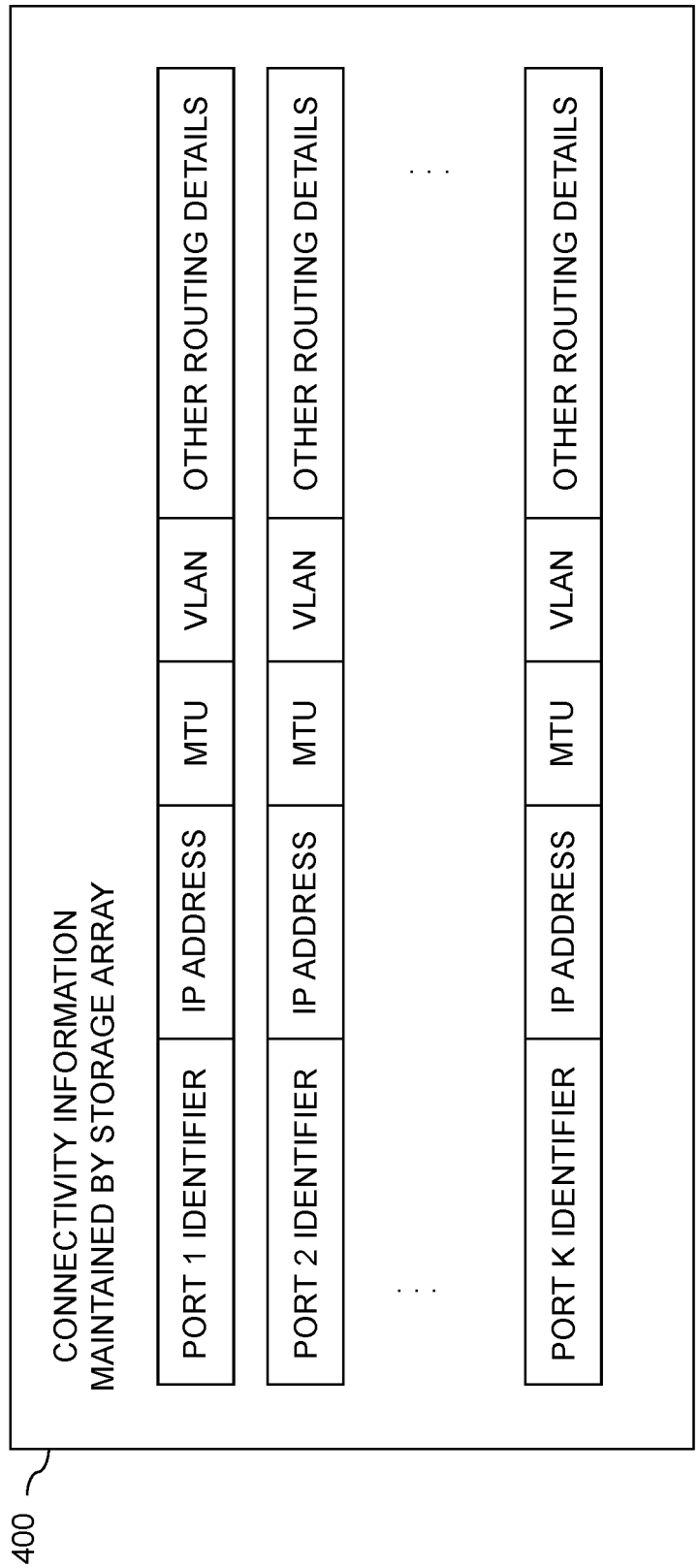
FIG. 4 shows an example of connectivity information maintained by a storage system that can be detected by a host device in an illustrative embodiment.

In some embodiments, the connectivity of a particular type comprises iSCSI connectivity between the host device 102-1 and the storage array 105. The connectivity information illustratively comprises at least a subset of an IP address, an MTU, and a VLAN configuration for at least one of the ports of the storage array 105. Other routing details are additionally or alternatively included in the connectivity information. An example of such connectivity information is illustrated in FIG. 4.

At least portions of the connectivity information obtained from the storage array 105 and characterizing one or more ports of the storage array 105 are stored in a data structure of a kernel-space portion of the MPIO driver 112-1.

In some embodiments, obtaining from a storage array 105 connectivity information characterizing one or more ports of the storage array 105 illustratively comprises obtaining the connectivity information directly from the storage array 105 utilizing an in-band communication mechanism in which one or more commands in a designated storage protocol are sent from the host device 102-1 to the storage array 105. Such an arrangement is utilized, for example, in embodiments such as that shown in FIG. 1, where host device 102-1 can directly communicate with the storage array 105 over the SAN 104.

Additionally or alternatively, obtaining from a storage array 105 connectivity information characterizing one or more ports of the storage array 105 illustratively comprises obtaining the connectivity information indirectly from the storage array 105 utilizing an out-of-band communication mechanism via at least one intermediary device.

An intermediary device in such an embodiment illustratively comprises the MPIO management station 115.

The MPIO management station 115 can comprise a server configured to obtain the connectivity information directly from the storage array 105, possibly for another host device 102 that cannot directly obtain such information. An example of an arrangement of this type will be described below in conjunction with FIG. 5A.

The MPIO management station 115 can alternatively comprise a server configured to obtain the connectivity information from an additional host device 102 that obtains the connectivity information directly from the storage array 105. An example of an arrangement of this type will be described below in conjunction with FIG. 5B.

In some embodiments, automatically establishing connectivity of a particular type comprises selecting one or more HBAs of the host device 102-1 for use with one or more of the ports of the storage array 105, and configuring the one or more selected HBAs utilizing at least a portion of the obtained connectivity information.

Host multi-pathing software implementing a multi-path layer comprising MPIO drivers 112 of respective host devices 102 can be configured to operate in conjunction with management appliance software, such as the above-noted PPMA, to identify host connectivity to a given storage array, and to facilitate automated connectivity provisioning for one or more host devices as disclosed herein. Such management appliance software is illustratively implemented on MPIO management station 115.

The host connectivity information is illustratively part of the connectivity information 122 of the storage array 105, and can be accessed by the MPIO drivers directly and/or via the MPIO management station 115.

In some embodiments, at least portions of the above-described example process for automated connectivity provisioning are performed by the MPIO management station 115, utilizing multi-pathing software executing on the processor 116. Accordingly, references above to "host multi-pathing software" are intended to be broadly construed, so as to encompass, in addition to MPIO drivers implemented on the host devices 102, other software relating to multi-pathing functionality of the host devices 102, such as host management software running on the MPIO management station 115.

As indicated previously, conventional approaches to provisioning a host for iSCSI connectivity are problematic, in that a host administrator or other user generally has to execute a complex manual process in order to implement the host provisioning.

Illustrative embodiments disclosed herein provide highly automated host provisioning arrangements that avoid the complications of conventional manual approaches.

As indicated above, in some embodiments, an MPIO driver of a give host device comprises a user-space component and a kernel-space component. The user-space component illustratively has root access on its corresponding host device. This user-space component is configured as disclosed herein to perform operations such as selecting the correct number of target host interfaces to match the number of configured storage array ports to meet best practice standards and configuring these host interfaces with settings such as IP address, MTU, VLAN configuration, and other routing details. This user-space component can also communicate with the kernel-space component of the MPIO driver.

The MPIO driver on the host device illustratively has connectivity to the MPIO management station 115, which may implement PowerPath® Management Appliance (PPMA) functionality to obtain access to the storage array, from which the MPIO driver can obtain storage array related information for use in host provisioning operations performed at least in part by the user-space component of the MPIO driver.

As indicated above, there are a number of different options for providing connectivity of the MPIO management station 115 to the storage array 105.

Figure 5A:
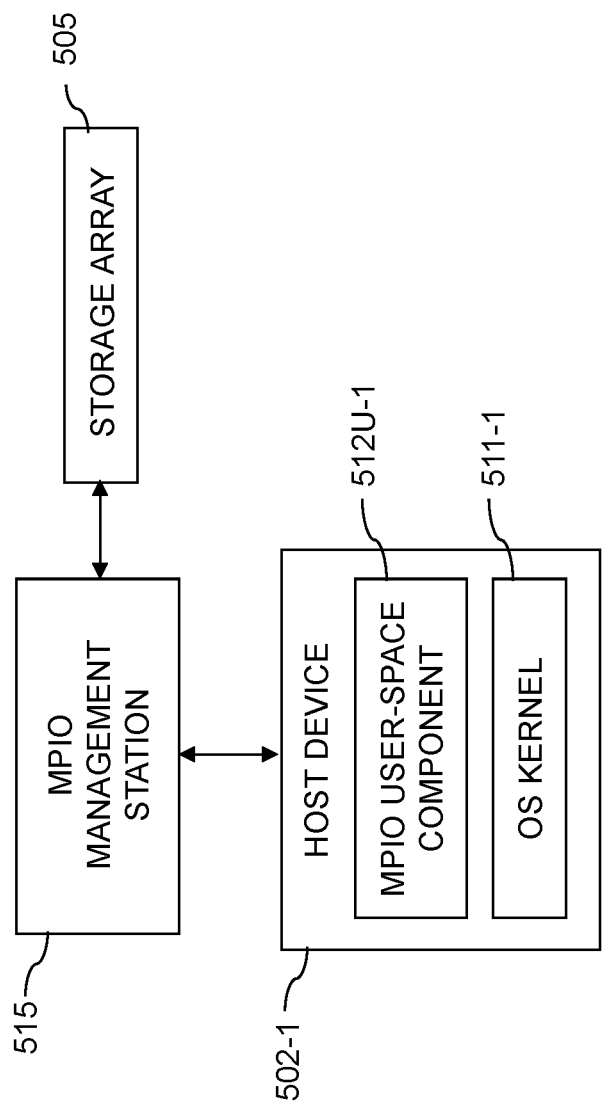
FIGS. 5A and 5B illustrate different example interconnection arrangements between a management station, a host device and a storage array in illustrative embodiments.

For example, the MPIO management station 115 is illustratively connected directly to the storage array 105 using protocols such as iSCSI, FC, NVMeoFC and/or others. The interconnection arrangement between a given host device, the MPIO management station and the storage array in such an embodiment is illustratively as shown in FIG. 5A.

In this embodiment, the MPIO driver comprises an MPIO module configured to interact with an operating system kernel of the host device.

Figure 5B:
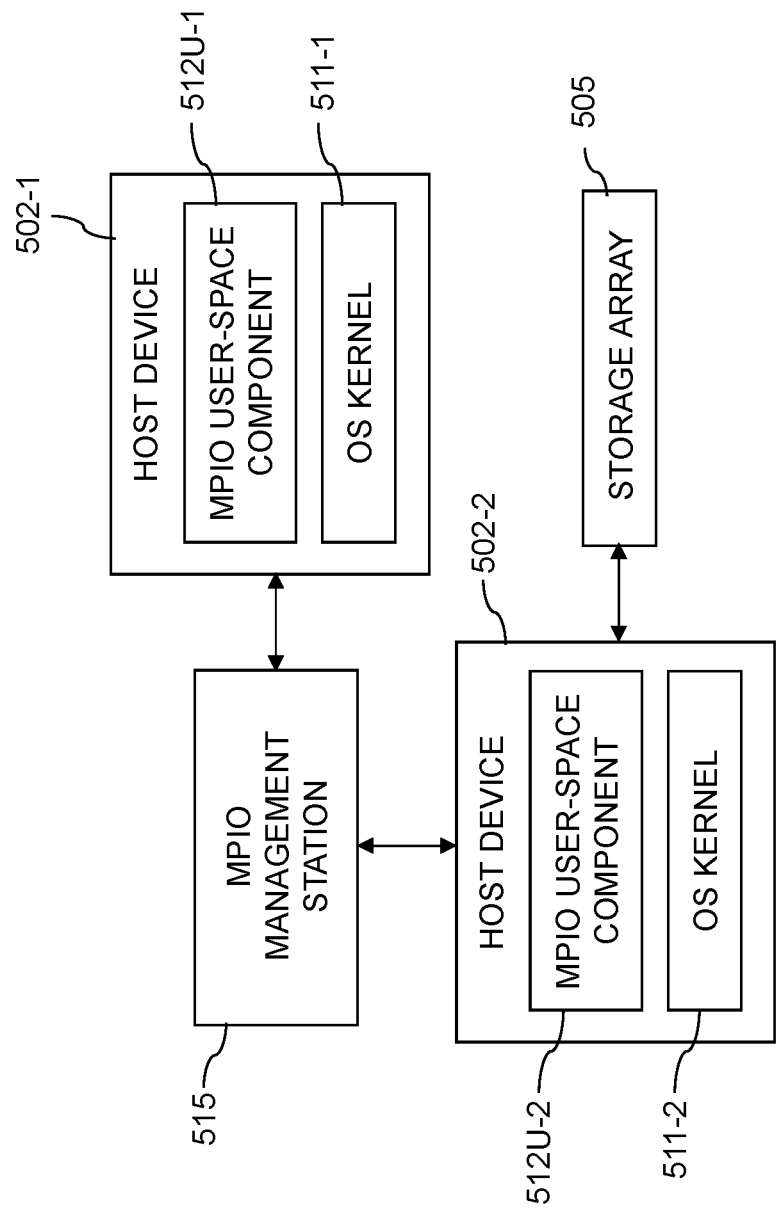

Another example connectivity option is for the MPIO management station 115 to communicate with one or more host devices 102 that are registered to it in order to determine if any of those hosts are connected to the storage array. The interconnection arrangement between a given host device, the management station and the storage array in such an embodiment is illustratively as shown in FIG. 5B.

If the storage array is not connected to any host visible to the MPIO management station, then another option is for the user to temporarily use FC HBA connectivity from the host to the storage array, as FC connectivity is far simpler to configure than iSCSI connectivity, in order to allow the host an initial path for communicating with the storage array to obtain needed information. Other types of available connectivity can be utilized to provide such an initial path in other embodiments.

The user-space component of the MPIO driver will use the connectivity to the storage array 105 to read the required information from the storage array. Such information illustratively includes IP address, available networks, Challenge Handshake Authentication Protocol (CHAP) parameters, and additional or alternative information.

The illustrative embodiments described above automate the host provisioning for iSCSI connectivity, by configuring the user-space component of an MPIO driver to collect required information and execute corresponding commands. In order to maintain appropriate security levels, where a host administrator or other user controls the process, the disclosed process can be initiated by a user command in which the user will supply enough information to the user-space component of the MPIO driver to ensure that the MPIO driver is connecting to the correct storage array and accessing only those storage devices that it should be accessing. The supplied information can include, for example, storage array serial number, storage array storage device numbers, etc.

Illustrative embodiments provide significant advantages over conventional practice. For example, these embodiments substantially reduce the amount of manual work required of the host administrator, thus reducing chances for human error. In addition, illustrative embodiments speed up the configuration process when multiple hosts are to be configured. Furthermore, these embodiments reduce the level of knowledge that the host administrator needs to have when configuring new devices to the host.

The multi-pathing software portions of example techniques described above may be similarly performed by a given MPIO driver on a corresponding host device, and similarly by other MPIO drivers on respective other host devices. Such MPIO drivers illustratively form a multi-path layer comprising multi-pathing software of the host devices. Other types of host drivers can be used in other embodiments. For example, in some embodiments, at least a portion of the disclosed automated connectivity provisioning functionality is carried out using one or more iSCSI drivers, or other types of non-MPIO host drivers.

Examples of host provisioning functions that can be carried out as part of automated connectivity provisioning using an MPIO driver in illustrative embodiments include at least a subset of the following:

1. Identifying 10 Gb Ethernet network interface cards (NICs) on the host to be used for iSCSI connectivity.
2. Renaming iSCSI NICS for easier identification.
3. Enabling "jumbo" frames on iSCSI NICs as necessary.
4. If already enabled, disabling Dynamic Host Configuration Protocol (DHCP) on iSCSI NICs.
5. Using NIC hardware driver tools to add VLAN IDs to iSCSI NICs.
6. Re-examining VLAN NIC configuration on host and renaming new VLAN NICs if created.
7. Configuring IP configuration on VLAN iSCSI NICs.
8. Ping storage array port IP addresses.
9. If not started, start iSCSI service on host.
10. Configure firewall settings for iSCSI service.
11. Add storage array network ports to host.

Other types of host provisioning functions can be carried out using automated connectivity provisioning in other embodiments.

More particular examples of the above automated connectivity provisioning arrangements will be described elsewhere herein in conjunction with the embodiments of FIGS. 2 through 5A and 5B. Other types of automated connectivity provisioning arrangements can be used in other embodiments.

These and other functions related to automated connectivity provisioning that are referred to herein as being performed by or under the control of the MPIO driver 112-1 can in some embodiments be performed at least in part outside of the MPIO driver 112-1, such as in the host device 102-1 generally.

The above-described functions associated with automated connectivity provisioning in the MPIO driver 112-1 in some embodiments are carried out at least in part under the control of its path selection logic 114-1. For example, the path selection logic 114-1 is illustratively configured to control performance of an algorithm comprising the steps of the flow diagram to be described below in conjunction with FIG. 2. In other embodiments, one or more such steps can be more generally performed by the host device 102-1.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver IO operations from its corresponding one of the sets of IO queues 110 to the storage array 105 over selected paths through the SAN 104, and to perform the disclosed functionality for automated connectivity provisioning.

Accordingly, functionality described above in the context of the first MPIO driver 112-1 and the first host device 102-1 is assumed to be similarly performed by each of the other MPIO drivers 112-2 through 112-N and/or more generally by their respective host devices 102-2 through 102-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support automated connectivity provisioning.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage array 105 in the present embodiment may comprise additional components not explicitly shown in the figure, such as a response time control module and IO operation priority queues, illustratively configured to make use of the above-described persistent memory. For example, the response time control module may be used to implement storage array based adjustments in response time for particular IO operations based at least in part on service level objective (SLO) information stored by the storage array 105 in its persistent memory. The response time control module is assumed to operate in conjunction with the above-noted IO operation priority queues.

The storage array 105 illustratively utilizes its IO operation priority queues to provide different levels of performance for IO operations. For example, the IO operation priority queues may have respective different priority levels. The storage array 105 may be configured to provide different priority levels for different ones of the IO operations by assigning different ones of the IO operations to different ones of the IO operation priority queues. The IO operation priority queues are illustratively associated with respective SLOs for processing of IO operations in the storage array 105. Process tags may be used in assigning different ones of the IO operations to different ones of the IO operation priority queues, as disclosed in U.S. Pat. No. 10,474,367, entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage devices 106 of the storage arrays 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more VNX®, VMAX®, Unity™ or PowerMax™ storage arrays, commercially available from Dell EMC.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and instances of path selection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 210, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

Figure 2:
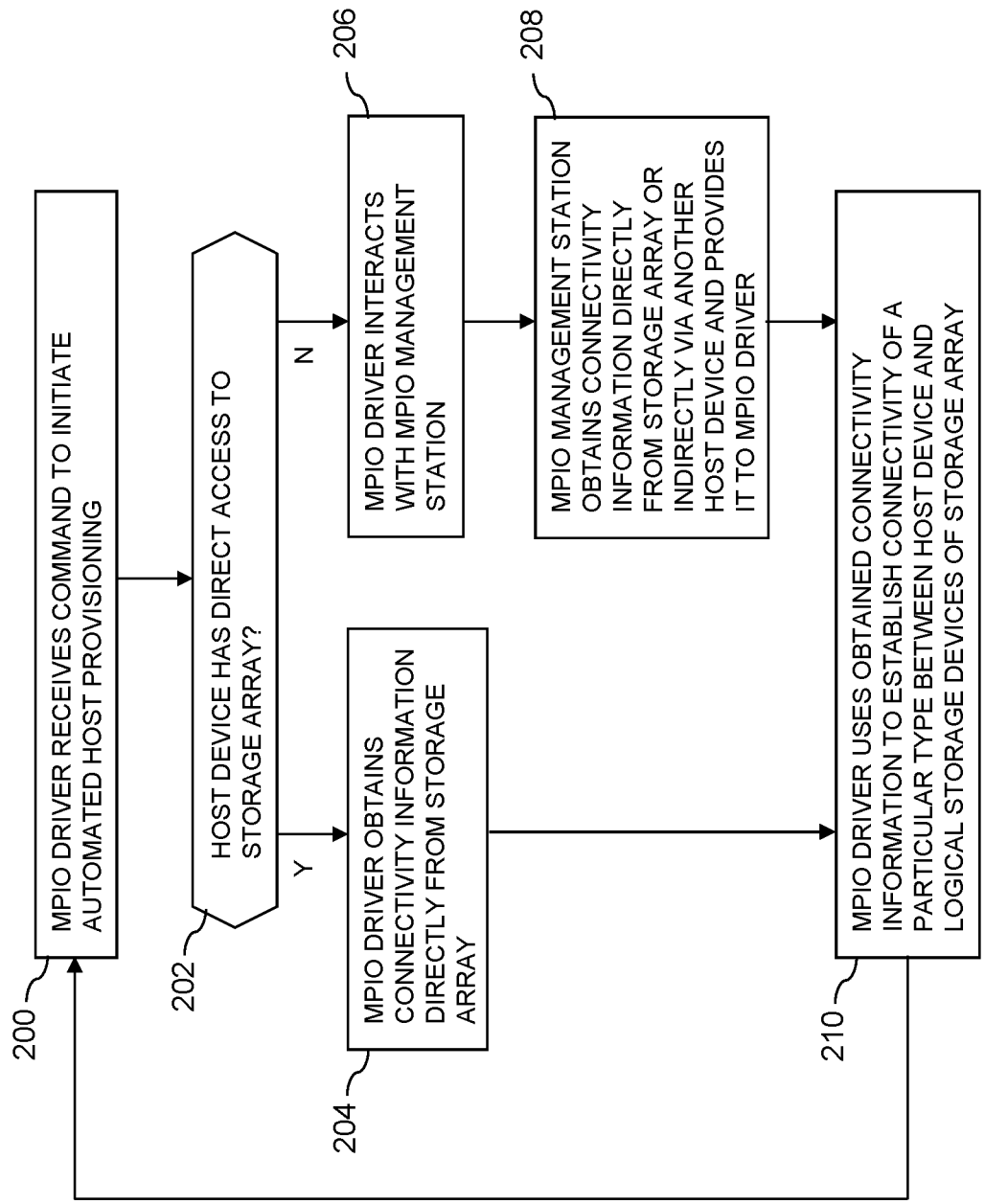
FIG. 2 is a flow diagram of a process for automated connectivity provisioning in a multi-path layer of a host device in an illustrative embodiment.

The steps of the FIG. 2 process are illustratively performed at least in part by or under the control of an MPIO driver of a given host device. For example, portions of the process may be carried out under the control of software, firmware and/or hardware of an instance of path selection logic deployed within the MPIO driver. Accordingly, the FIG. 2 process may be viewed as an example of an algorithm performed by the path selection logic 114-1 of the MPIO driver 112-1 of host device 102-1. Additionally or alternatively, the MPIO driver 112-1 may comprise a user-space component and a kernel-space component, with the FIG. 2 process bring performed primarily by the user-space component of the MPIO driver 112-1. Other arrangements of host device components and/or other system components can be configured to perform at least portions of one or more of the steps in other embodiments.

In step 200, the MPIO driver receives at least one command to initiate automated host provisioning.

In step 202, a determination is made as to whether or not the host device has direct access to the storage array. If the host device has direct access to the storage array, the process moves to step 204, and otherwise moves to step 206 as indicated.

In step 204, the MPIO driver obtains connectivity information directly from the storage array. An example of connectivity information maintained by the storage array will be described below in conjunction with FIG. 4. The process then moves to step 210, bypassing steps 206 and 208 as indicated.

In step 206, the MPIO driver interacts with an MPIO management station such as MPIO management station 115 of system 100.

In step 208, the MPIO management station obtains connectivity information directly from the storage array, illustratively using an arrangement such as that illustrated in FIG. 5A, or indirectly via another host device, illustratively using an arrangement such as that illustrated in FIG. 5B. In either case, the MPIO management station provides the obtained connectivity information to the MPIO driver.

In step 210, the MPIO driver uses the obtained connectivity information to establish connectivity of a particular type between the host device and one or more logical storage devices of the storage array.

The process then returns to step 200 in order to perform one or additional instances of the process with each such additional instance being performed responsive to receipt of one or more commands to initiate automated host provisioning.

Multiple additional instances of the FIG. 2 process may be performed in respective additional host devices that share the storage array. Other embodiments can include multiple storage arrays, with the disclosed functionality for automated connectivity provisioning being implemented for each of those storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for automated connectivity provisioning. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different automated connectivity provisioning arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
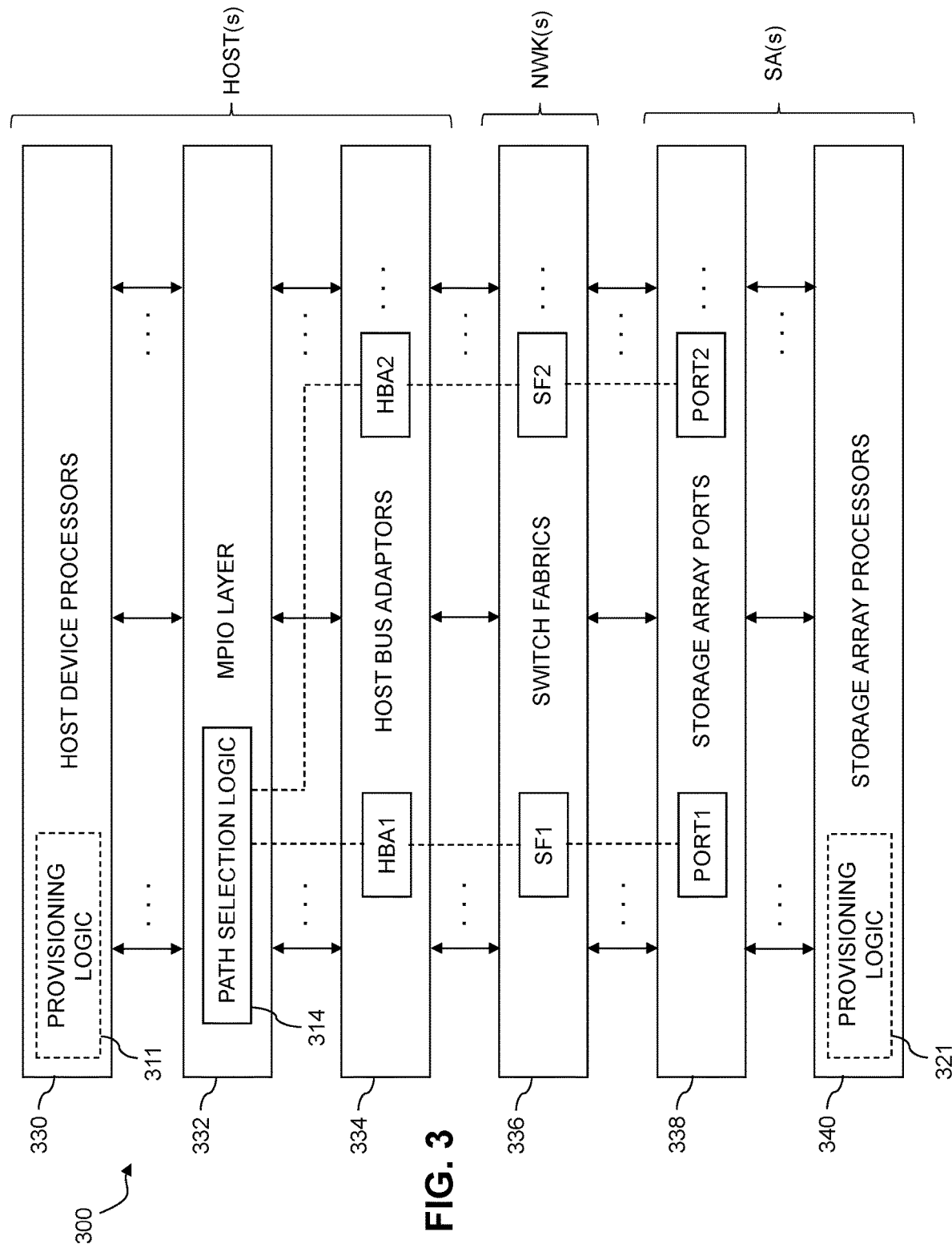
FIG. 3 is a block diagram showing multiple layers of a layered system architecture that includes a multi-path layer with functionality for automated connectivity provisioning in an illustrative embodiment.

Referring now to FIG. 3, another illustrative embodiment is shown. In this embodiment, an information processing system 300 comprises host-side provisioning logic 311, path selection logic 314 and storage-side provisioning logic 321. There may be separate instances of one or more such elements associated with each of a plurality of system components such as host devices and storage arrays of the system 300.

The system 300 is configured in accordance with a layered system architecture that illustratively includes a host device processor layer 330, an MPIO layer 332, an HBA layer 334, a switch fabric layer 336, a storage array port layer 338 and a storage array processor layer 340. The host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements automated connectivity provisioning utilizing one or more MPIO drivers of the MPIO layer 332, and associated instances of host-side provisioning logic 311 and storage-side provisioning logic 321. The host-side provisioning logic 311 is illustratively shown as part of one or more host device processors of the host device processor layer 330. Similarly, the storage-side provisioning logic 321 is illustratively shown as part of one or more storage array processors of the storage array processor layer 340. A wide variety of other distributed logic arrangements are possible, and the host-side provisioning logic 311 and storage-side provisioning logic 321 are therefore shown in dashed outline in the figure. The host-side provisioning logic 311 and storage-side provisioning logic 321 illustratively operates in conjunction with one or more MPIO drivers of the MPIO layer 332 to facilitate automated connectivity provisioning in the manner disclosed herein. For example, host-side and storage-side functionality associated with automated connectivity provisioning that is not performed by the one or more MPIO drivers is illustratively performed by respective ones of the provisioning logic 311 and provisioning logic 321.

The MPIO layer 332 is an example of what is also referred to herein as a multi-path layer, and comprises one or more MPIO drivers implemented in respective host devices. Each such MPIO driver illustratively comprises an instance of path selection logic 314 configured to implement functionality for automated connectivity provisioning substantially as previously described, illustratively though interaction with host-side provisioning logic 311 and storage-side provisioning logic 321. Additional or alternative layers and path selection logic arrangements can be used in other embodiments.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment therefore selects paths for delivery of IO operations to the one or more storage arrays having the storage array ports of the storage array port layer 338.

It is assumed in this embodiment that the host devices through their respective MPIO drivers and respective instances of path selection logic 314 provide functionality for automated connectivity provisioning, possibly with involvement of other host device components such as the host-side provisioning logic 311 and the storage-side provisioning logic 321.

Accordingly, the path selection logic 314 in some embodiments utilizes the provisioning logic 311 and 321 in automatically establishing connectivity to one or more logical storage devices of one or more storage arrays, and determines appropriate paths over which to send particular IO operations to those logical storage devices of the one or more storage arrays.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Additional illustrative embodiments will now be described. It is assumed in these embodiments that the MPIO driver of a given host device provides at least portions of the disclosed automated connectivity provisioning functionality, possibly with involvement of one or more other host device components.

Referring now to FIG. 4, an example of connectivity information 400 maintained by a storage array is shown. The connectivity information as shown in this embodiment comprises a table that includes a plurality of entries, each illustratively corresponding to a particular port of the storage array 105. The port identifiers are denoted Port 1 Identifier, Port 2 Identifier, . . . Port K Identifier, and are associated with respective entries illustratively corresponding to respective rows of the table, as shown. Each such entry includes, in addition to its corresponding port identifier, an IP address of that port, an MTU of that port and a VLAN configuration of that port. Other routing details are additionally or alternatively included. Such information represents examples of what is more generally referred to herein as "connectivity information" characterizing one or more ports of the storage array 105, and is illustratively stored as part of the connectivity information 122 of the storage array 105. Additional or alternative types of connectivity information can be used in other embodiments.

The example connectivity information 400 shown in FIG. 4, illustratively including IP address, MTU, VLAN configuration, and additional or alternative routing details, is obtained by MPIO driver 112-1 of host device 102-1, and utilized by the MPIO driver 112-1 to automatically establish iSCSI connectivity between the host device 102-1 and one or more logical storage devices of the storage array 105.

The particular connectivity information shown in FIG. 4 is only an example, and numerous other types and arrangements of entries and fields can be used. The term "connectivity information" as used herein is therefore intended to be broadly construed.

On the storage side, such connectivity information is illustratively stored in a storage array memory accessible to a multi-path layer of the host device. Other types of data structures can be used in other embodiments.

On the host side, at least portions of such connectivity information obtained from the storage array and characterizing one or more ports of the storage array are illustratively stored in a data structure of a kernel-space portion of the MPIO driver 112-1, although other storage arrangements with other types of data structures can be used.

In automatically establishing iSCSI connectivity between the host device 102-1 and one or more logical storage devices of the storage array 105, the MPIO driver 112-1 illustratively selects one or more HBAs of the host device 102-1 for use with one or more of the ports of the storage array 105, and configures the one or more selected HBAs utilizing at least a portion of the obtained connectivity information.

In some embodiments, an MPIO driver obtains connectivity information characterizing one or more ports of a storage array directly from the storage array. For example, MPIO driver 112-1 is illustratively configured to obtain the connectivity information directly from the storage array 105 utilizing an in-band communication mechanism in which one or more commands in a designated storage protocol are sent from the MPIO driver 112-1 or another host device component to the storage array 105.

However, it is possible in some embodiments that one or more MPIO drivers of one or more host devices may be unable to directly obtain the connectivity information directly from the storage array.

FIGS. 5A and 5B illustrate different alternative ways in which an MPIO driver of a host device can obtain the connectivity information characterizing the one or more ports of the storage array, other than through direct communication with the storage array. Such arrangements illustratively involve obtaining the connectivity information indirectly from the storage array utilizing an out-of-band communication mechanism via at least one intermediary device, which may be a server.

For example, referring initially to FIG. 5A, a host device 502-1 comprises an MPIO driver having an MPIO user-space component 512U-1. The MPIO user-space component 512U-1 is associated with an Operating System (OS) kernel 511-1 of the host device 502-1. The MPIO user-space component 512U-1 in this embodiment obtains the connectivity information from an intermediary device that comprises an MPIO management station 515, where the MPIO management station 515 is illustratively implemented as a server configured to obtain the connectivity information directly from a storage array 505.

Turning now to FIG. 5B, another example is shown in which the MPIO management station 515 uses a different host device 502-2 to obtain the connectivity information for the host device 502-1. This embodiment therefore utilizes two intermediary devices, namely, the MPIO management station 515 and the host device 502-2. The host device 502-2 comprises an MPIO driver having an MPIO user-space component 512U-2. The MPIO user-space component 512U-2 is associated with an OS kernel 511-2 of the host device 502-2. The MPIO user-space component 512U-1 in this embodiment obtains the connectivity information from the MPIO management station 515, where the MPIO management station 515 obtains the connectivity information from the host device 502-2, which is configured to obtain the connectivity information directly from the storage array 505. This is an example of an arrangement in which an MPIO management station obtains connectivity information for a first host device from an additional host device that obtains the connectivity information directly from a storage array. Other arrangements can be used in other embodiments.

The above-described processes, algorithms and other features and functionality disclosed herein are presented by way of illustrative example only, and other embodiments can utilize additional or alternative arrangements.

Also, as mentioned previously, different instances of the above-described processes, algorithms and other automated connectivity provisioning techniques can be performed by different MPIO drivers in different host devices, or using other types of host drivers, such as, for example, iSCSI drivers.

The particular automated connectivity provisioning arrangements described above are therefore presented by way of illustrative example only. Numerous alternative arrangements of these and other features can be used in implementing the automated connectivity provisioning in other illustrative embodiments.

The illustrative embodiments disclosed herein can provide a number of significant advantages relative to conventional arrangements.

For example, some embodiments configure host devices to include functionality for automated connectivity provisioning for iSCSI connectivity and other types of connectivity between each such host device and a storage array or other storage system, so as to advantageously avoid the complications of conventional manual approaches, such as requiring a host administrator or other user to execute a complex manual process in order to implement the host connectivity provisioning.

Such embodiments substantially reduce the amount of manual work required of the host administrator, thus reducing chances for human error. In addition, illustrative embodiments speed up the configuration process when multiple hosts are to be configured. Furthermore, these embodiments reduce the level of knowledge that the host administrator needs to have when configuring new devices to the host.

Illustrative embodiments can also advantageously prevent significant degradations in IO processing performance that might otherwise occur if conventional manual processes were required.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™, or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic and additional or alternative components. Also, the particular configurations of system and device elements and associated processing operations illustratively shown in the drawings can be varied in other embodiments. For example, a wide variety of different host device configurations and associated automated connectivity provisioning arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a host device comprising a processor coupled to a memory;
where the host device is configured:
to obtain from a storage system connectivity information characterizing one or more ports of the storage system; and
to automatically establish connectivity of a particular type between the host device and one or more logical storage devices of the storage system based at least in part on the obtained connectivity information;
wherein the host device further comprises a multi-path layer comprising at least one multi-path input-output driver configured to control delivery of input-output operations from the host device to particular ports of the storage system over selected ones of a plurality of paths through a network; and
wherein the multi-path input-output driver comprises a user-space component and a kernel-space component, and wherein obtaining connectivity information and automatically establishing connectivity of a particular type are performed by the user-space component of the multi-path input-output driver.

2. The apparatus of claim 1 wherein the connectivity of a particular type comprises Internet Small Computer System Interface (iSCSI) connectivity between the host device and the storage system.

3. The apparatus of claim 1 wherein the connectivity information comprises at least a subset of an Internet Protocol (IP) address, a maximum transmission unit (MTU), and a virtual local area network (VLAN) configuration for at least one of the ports of the storage system.

4. The apparatus of claim 1 further comprising one or more additional host devices each configured to communicate over the network with the storage system and wherein each additional host device comprises at least one multi-path input-output driver configured to control delivery of input-output operations from that host device to particular ports of the storage system over selected ones of a plurality of paths through the network.

5. The apparatus of claim 1 wherein the paths are associated with respective initiator-target pairs with each of a plurality of initiators of the initiator-target pairs comprising a corresponding host bus adaptor of the host device and each of a plurality of targets of the initiator-target pairs comprising a corresponding one of the ports of the storage system.

6. The apparatus of claim 1 wherein at least portions of the connectivity information obtained from the storage system and characterizing one or more ports of the storage system is stored in a data structure of the kernel-space portion of the multi-path input-output driver.

7. The apparatus of claim 1 wherein obtaining from a storage system connectivity information characterizing one or more ports of the storage system comprises obtaining the connectivity information directly from the storage system utilizing an in-band communication mechanism in which one or more commands in a designated storage protocol are sent from the host device to the storage system.

8. The apparatus of claim 1 wherein obtaining from a storage system connectivity information characterizing one or more ports of the storage system comprises obtaining the connectivity information indirectly from the storage system utilizing an out-of-band communication mechanism via at least one intermediary device.

9. The apparatus of claim 8 wherein said at least one intermediary device comprises a multi-path input-output management station.

10. The apparatus of claim 9 wherein the multi-path input-output management station comprises a server configured to obtain the connectivity information directly from the storage system.

11. The apparatus of claim 1 wherein automatically establishing connectivity of a particular type comprises:
selecting one or more host bus adaptors for use with one or more of the ports of the storage system; and
configuring the one or more selected host bus adaptors utilizing at least a portion of the obtained connectivity information.

12. An apparatus comprising:
a host device comprising a processor coupled to a memory;
where the host device is configured:
to obtain from a storage system connectivity information characterizing one or more ports of the storage system; and
to automatically establish connectivity of a particular type between the host device and one or more logical storage devices of the storage system based at least in part on the obtained connectivity information;
wherein the host device further comprises a multi-path layer comprising at least one multi-path input-output driver configured to control delivery of input-output operations from the host device to particular ports of the storage system over selected ones of a plurality of paths through a network;

wherein obtaining from a storage system connectivity information characterizing one or more ports of the storage system comprises obtaining the connectivity information indirectly from the storage system utilizing an out-of-band communication mechanism via at least one intermediary device;

wherein said at least one intermediary device comprises a multi-path input-output management station; and wherein the multi-path input-output management station comprises a server configured to obtain the connectivity information from an additional host device that obtains the connectivity information directly from the storage system.

13. A method comprising:

obtaining from a storage system connectivity information characterizing one or more ports of the storage system; and automatically establishing connectivity of a particular type between a host device and one or more logical storage devices of the storage system based at least in part on the obtained connectivity information;

wherein the host device comprises a multi-path layer comprising at least one multi-path input-output driver configured to control delivery of input-output operations from the host device to particular ports of the storage system over selected ones of a plurality of paths through a network;

wherein the multi-path input-output driver comprises a user-space component and a kernel-space component, and wherein obtaining connectivity information and automatically establishing connectivity of a particular type are performed by the user-space component of the multi-path input-output driver; and wherein the method is performed by the host device, the host device comprising a processor coupled to a memory.

14. The method of claim 13 wherein the connectivity of a particular type comprises Internet Small Computer System Interface (iSCSI) connectivity between the host device and the storage system.

15. The method of claim 13 wherein automatically establishing connectivity of a particular type comprises:

selecting one or more host bus adaptors for use with one or more of the ports of the storage system; and configuring the one or more selected host bus adaptors utilizing at least a portion of the obtained connectivity information.

16. A computer program product comprising a non-transitory processor-readable storage medium having stored therein program code of one or more software programs, wherein the program code, when executed by a host device comprising a processor coupled to a memory, causes the host device:

to obtain from a storage system connectivity information characterizing one or more ports of the storage system; and to automatically establish connectivity of a particular type between the host device and one or more logical storage devices of the storage system based at least in part on the obtained connectivity information;

wherein the host device further comprises a multi-path layer comprising at least one multi-path input-output driver configured to control delivery of input-output operations from the host device to particular ports of the storage system over selected ones of a plurality of paths through a network; and wherein the multi-path input-output driver comprises a user-space component and a kernel-space component, and wherein obtaining connectivity information and automatically establishing connectivity of a particular type are performed by the user-space component of the multi-path input-output driver.

17. The computer program product of claim 16 wherein the connectivity of a particular type comprises Internet Small Computer System Interface (iSCSI) connectivity between the host device and the storage system.

18. The computer program product of claim 16 wherein automatically establishing connectivity of a particular type comprises:

selecting one or more host bus adaptors for use with one or more of the ports of the storage system; and configuring the one or more selected host bus adaptors utilizing at least a portion of the obtained connectivity information.

19. The computer program product of claim 16 wherein obtaining from a storage system connectivity information characterizing one or more ports of the storage system comprises obtaining the connectivity information indirectly from the storage system utilizing an out-of-band communication mechanism via at least one intermediary device comprising a multi-path input-output management station.

20. The computer program product of claim 19 wherein the multi-path input-output management station comprises a server configured to obtain the connectivity information from an additional host device that obtains the connectivity information directly from the storage system.

* * * * *